Aug. 20, 1935.  A. B. WELTY  2,011,923

CLEARING DEVICE FOR HARVESTERS

Filed March 19, 1934

Inventor
Albert B. Welty
By V. F. Lusague
Atty.

UNITED STATES PATENT OFFICE 2,011,923

CLEARING DEVICE FOR HARVESTERS

Albert B. Welty, Moline, Ill., assignor to International Harvester Company, a corporation of New Jersey Application March 19, 1934, Serial No. 716,312

5 Claims. (Cl. 56—316)

The invention relates to harvesters and particularly to a clearing device for the divider or tracker thereof.

In employing a harvester of the harvester thresher type, for example, in vine crops, it is found that vines and also weeds objectionably build up on the outside divider to such an extent that it cannot perform its function of marking the track of travel. Further, objectionable bunching of material on the platform results which causes uneven feeding and in harvester threshers uneven feed caused by intermittent bunching is serious as poor threshing takes place and parts sometimes are broken due to overloading. Accordingly, the present invention especially has to do with the provision of a cutting mechanism to be associated with the outside divider in a manner to sever the tangled vines and weeds to clear the same from the divider and prevent bunching on the harvester platform.

The primary object is to provide an improved track clearer for harvesters.

Another object is to provide a cutting mechanism for an outside divider and to operate the same from the reel shaft; and, lastly, it is an object generally to improve devices of this kind to the end that the divider will properly function even in tangled conditions.

Briefly, such desired objects may be achieved in locating a simple cutting mechanism over the outside divider mounted on the outer or grainward end of a harvester platform, and driving such cutting mechanism from the rotatable reel shaft.

In the accompanying sheet of drawing illustrating a practicable form of the invention:

Figure 1:
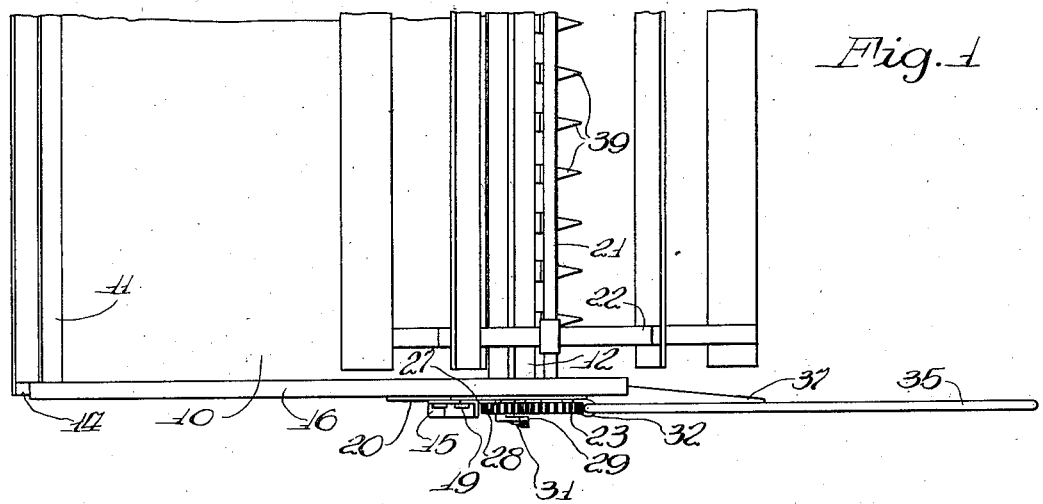
Figure 1 is a general plan view of the outer end of a harvester platform such as employed in a harvester thresher.
Figure 2:
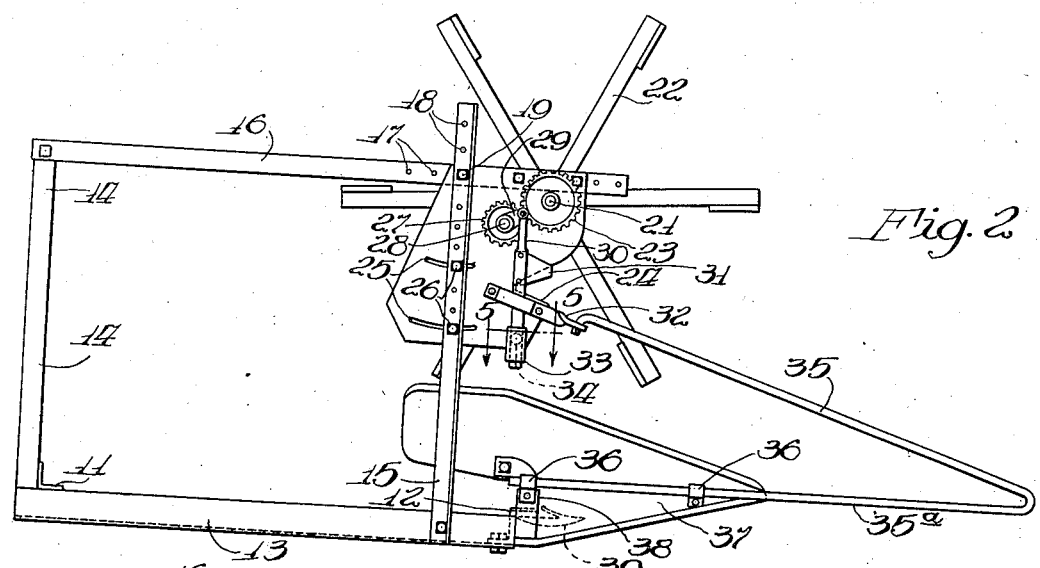
Figure 2 is an end elevational view of the structure shown in Figure 1.
Figure 3:
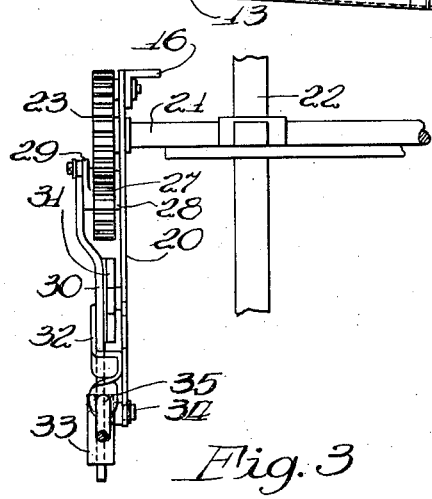
Figure 3 is a fragmentary front elevational view to show the drive from the reel shaft to the knife.
Figure 4:
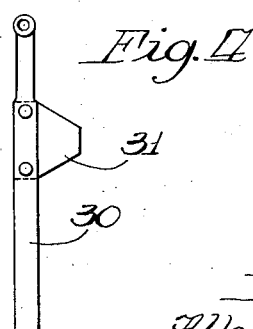
Figure 4 is a detail view of the knife and the pitman on which it is mounted; and, Figure 5 is a detail cross sectional view through the pitman mounting and its guide, as seen along the line 5—5 appearing in Figure 2, when looking in the direction of the arrows.
Figure 5:
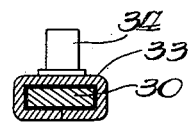

The harvester platform is shown at 10 and is delineated by a rear transverse angle bar 11, a front transverse Z-bar 12, and an outer, longitudinal frame piece 13. The structure includes a rear upright 14 and a front upright 15, said two uprights being spanned by a reel support frame 16 having a series of holes 17 therein, while the upright 15 has a series of holes 18 therein. A bolt 19 secures the parts 15 and 16 together.

The support 16 at its forward end carries a vertical sheet metal plate 20 in which is journaled the transverse reel shaft 21 carrying the usual reel 22. The reel shaft 21 projects grainwardly of the plate 20 and on said projected end has a gear 23 fast thereon to turn therewith. The plate 20 at its forward edge is notched rearwardly, as shown at 24. Further, said plate 20 has a pair of spaced arcuate slots 25 through which bolts 26 are passed to secure said plate to the upright 15, as shown.

The gear 23 meshes with and drives a gear 27 on a shaft 28, said shaft 28 operating a crank 29, to which is connected a reciprocating pitman 30 that carries a knife 31. Said knife is operated by the pitman and moves closely adjacent the plate 20 and across the notch 24 therein with a shear action. The pitman 30 operates between the plate 20 and a guide 32 connected to the plate. At its lower edge, said plate 20 carries another guide socket 33, into which the lower end of the pitman 30 slidably fits, said guide socket 33 including a pin 34 rockably mounted in said plate 20.

The forward end of the guide 32 is extended forwardly of the plate 20 and formed with a hole pivotally to receive and carry the hooked rear end of a forwardly extending wire, lifting element 35. This lifter has a leg 35a extending horizontally rearwardly, said horizontal leg being releasably connected by a pair of spaced clips 36 to a tracker or divider board 37 carried by a bracket 38 rigidly connected to the front outside corner of the platform structure. The Z-bar 12 carries the usual guards 39.

In operation, the platform moves through the standing crop and cuts the same in the usual, well-known manner, the divider board 37 functioning to mark the track of the cut swath. When vines, or weeds tend to build up over the board 37 to prevent it from making its proper mark, or to cause bunching on the platform, the lifter 35 comes into play by guiding such vines or weeds to the notch 24 in the plate 20, where the knife 31 operates to sever the vines, etc., to prevent choking of the divider board. In this fashion, bunching of the material over the divider board and on the platform cannot take place, as the moving knife is constantly operative to cut it away. The knife 31 is moved up and down with a shear action across the cut-out 24 by the pitman 30, which reciprocates up and down and in so doing slides at its lower end in the guide 33. The guide 33 can rock about its pin 34 to take care of the orbital motion of the pitman 30 at its upper end due to its connection to the crank 29. As described, the drive to the knife is taken from the outer end of the reel shaft 21 through the gears 23 and 27.

By means of the holes 17 on the frame 16, the reel 22, shaft 21 and plate 20 can be adjustably fixed fore or aft to change the position of the reel with respect to the cutting mechanism represented by the guards 39. Also, by means of the holes 18 in the upright 15, the reel can be adjustably set up or down. When such adjustments are made, the plate 20 may be swung with the frame 16 because, when the bolts 26 are loosened, such movement is permitted by the arcuate slots 25. Further, by means of the clips 36, the lifter 35 may be adjusted to properly position it with respect to the divider 37, as desired.

From this disclosure it can now be seen that an improved and simplified cutting attachment has been provided for the divider of harvesters, which device achieves all of the desirable objects heretofore recited.

It is the intention to cover herein all changes and modifications which do not depart from the spirit and scope of the invention as defined in the appended claims.

What is claimed is:

1. A harvester having a platform, a reel supporting frame thereon, a divider carried by the platform, a cutting mechanism above the divider including a stationary shear plate carried by the reel supporting frame, and a lifter associated with the divider to direct vines etc. to the cutting mechanism.

2. A harvester having a platform, a reel supporting frame on the platform, a divider on the platform, a reel carrying shaft on the frame, a stationary shear plate having a notch, said plate carried by the frame above the divider, a movable cutter carried by the plate adjacent said notch, means to drive the movable cutter from the reel shaft, and means associated with the divider to lift vines etc. over the divider and to direct them to the notch to be severed by the movable cutter.

3. A harvester having a platform, a reel supporting frame on the platform, a divider on the platform, a reel carrying shaft on the frame, a gear on the shaft, a stationary shear plate having a notch, said plate carried by the frame, a gear on the plate in mesh with the gear on the reel shaft, a crank operable by the gear on the plate, a vertically disposed pitman operable by the crank, a knife on the pitman movable across the notch in the plate, a rockable guide slidingly carrying the lower end of the pitman on the plate, and lifter means associated with the divider to guide vines etc. over the divider to the knife to be severed thereby.

4. A harvester having a transversely extending harvester platform, a divider arranged at one end of the platform, an upright frame mounted on the platform and carrying a transverse reel shaft above the platform, a reel on said shaft, a plate carried by the frame above the divider, a lifter associated with the divider and connected with said plate, a vine cutting mechanism carried by the plate above the divider for severing vines directed thereto by the lifter, and operative connections between the cutting mechanism and reel shaft to operate the said cutting mechanism.

5. A harvester having a transversely extending harvester platform, a longitudinally and forwardly extending divider carried at the outer end of said platform, a substantially vertical frame member carried on the platform, a bracket supported by said frame member, a transverse reel shaft including a reel carried at one end by the frame member, a lifter associated with the divider and extending forwardly therefrom, said lifter including a rearwardly and upwardly extending portion connected to the bracket, cutting mechanism associated with the bracket including a reciprocating part, and gearing connected between the reel shaft and said part to drive the latter.

ALBERT B. WELTY.